(12) United States Patent
Pritchard et al.

(10) Patent No.: US 11,112,114 B2
(45) Date of Patent: Sep. 7, 2021

(54) COMBUSTOR PANELS FOR GAS TURBINE ENGINES

(71) Applicant: United Technologies Corporation, Farmington, CT (US)

(72) Inventors: Thomas Pritchard, Boston, MA (US); Stephen K. Kramer, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 132 days.

(21) Appl. No.: 16/519,518

(22) Filed: Jul. 23, 2019

(65) Prior Publication Data

US 2021/0025591 A1 Jan. 28, 2021

(51) Int. Cl.
*F23R 3/06* (2006.01)
*F23R 3/00* (2006.01)

(52) U.S. Cl.
CPC .............. *F23R 3/002* (2013.01); *F23R 3/06* (2013.01); *F23R 2900/03041* (2013.01); *F23R 2900/03044* (2013.01)

(58) Field of Classification Search
CPC .. F23R 3/002; F23R 2900/03044; F23R 3/06; F23R 2900/03041; G05D 2260/201; F05D 2260/201
See application file for complete search history.

(56) References Cited

U.S. PATENT DOCUMENTS

| 2,938,333 | A | | 5/1960 | Wetzler | |
|---|---|---|---|---|---|
| 3,623,711 | A | * | 11/1971 | Thorstenson | F23R 3/002 60/754 |
| 5,265,409 | A | | 11/1993 | Smith et al. | |
| 10,641,099 | B1 | * | 5/2020 | Waite | F01D 5/187 |
| 10,801,453 | B2 | * | 10/2020 | Zankl | F02M 63/02 |
| 2008/0264065 | A1 | * | 10/2008 | Gerendas | F23R 3/007 60/754 |
| 2013/0205794 | A1 | * | 8/2013 | Xu | F01D 5/186 60/754 |

(Continued)

FOREIGN PATENT DOCUMENTS

| EP | 3054113 A1 | 8/2016 |
|---|---|---|
| EP | 3056816 A1 | 8/2016 |

(Continued)

OTHER PUBLICATIONS

European Search Report, European Application No. 20185813.1, dated Nov. 20, 2020, European Patent Office; European Search Report 7 pages.

*Primary Examiner* — Gerald L Sung
(74) *Attorney, Agent, or Firm* — Cantor Colburn LLP

(57) ABSTRACT

Combustor panels of gas turbine engines and gas turbine engines are described. The combustor panels include a hot side configured to be exposed to combustion within a gas turbine engine, a cold side opposite the hot side of the combustor panel, the cold side configured to receive cooling flow thereon, and a peak-valley gridded pattern formed on the cold side, the peak-valley gridded pattern comprising a plurality of recessed cells arranged in a grid pattern, with each recessed cell having a peak, angled sidewalls, and an effusion hole located at a bottom of the angled sidewalls.

18 Claims, 6 Drawing Sheets

(56) References Cited

U.S. PATENT DOCUMENTS

| | | | | |
|---|---|---|---|---|
| 2014/0238030 A1* | 8/2014 | Gerendas | ................. | F23R 3/06 |
| | | | | 60/754 |
| 2014/0338304 A1* | 11/2014 | Schilp | .................... | F01D 9/023 |
| | | | | 60/39.23 |
| 2015/0027127 A1* | 1/2015 | Clemen | ................. | F23R 3/002 |
| | | | | 60/752 |
| 2016/0109128 A1* | 4/2016 | Drake | ....................... | F02C 7/18 |
| | | | | 60/782 |
| 2016/0370008 A1 | 12/2016 | Drake et al. | | |
| 2017/0191417 A1* | 7/2017 | Bunker | ................... | F01D 25/12 |
| 2019/0186740 A1* | 6/2019 | Moura | ..................... | F23R 3/06 |

FOREIGN PATENT DOCUMENTS

| | | | |
|---|---|---|---|
| WO | 2014201249 | A1 | 12/2014 |
| WO | 2015002686 | A2 | 1/2015 |
| WO | 2015050592 | A2 | 4/2015 |

* cited by examiner

COMBUSTOR PANELS FOR GAS TURBINE ENGINES

BACKGROUND

The subject matter disclosed herein generally relates to impingement cooled components for gas turbine engines and, more particularly, impingement cooled components, such as combustor panels, having integral thermal transfer features for improved thermal management of such components.

A combustor of a gas turbine engine may be configured and required to burn fuel in a minimum volume (e.g., a combustion chamber). Such configurations may place substantial heat load on the structure of the combustor. The heat loads may dictate that special consideration is given to structures which may be configured as heat shields or panels configured to protect the walls of the combustor, with the heat shields being air cooled. Even with such configurations, excess temperatures at various locations may occur leading to oxidation, cracking, and high thermal stresses of the heat shields or panels. As such, impingement and convective cooling of panels of the combustor wall may be used. Convective cooling may be achieved by air that is trapped between the panels and a shell of the combustor. Impingement cooling is a process of directing relatively cool air from a location exterior to the combustor toward a back or underside of the panels. Leakage of impingement cooling air may occur through effusion holes without the panel or between adjacent panels at gaps that exist between the panels and thus form film cooling over a surface of the panels. However, it may be advantageous to have improved cooling mechanisms for combustor panels.

SUMMARY

According to some embodiments, combustor panels of gas turbine engines are provided. The combustor panels include a hot side configured to be exposed to combustion within a gas turbine engine, a cold side opposite the hot side of the combustor panel, the cold side configured to receive cooling flow thereon, and a peak-valley gridded pattern formed on the cold side, the peak-valley gridded pattern comprising a plurality of recessed cells arranged in a grid pattern, with each recessed cell having a peak, angled sidewalls, and an effusion hole located at a bottom of the angled sidewalls.

In addition to one or more of the features described above in one or more of the above embodiments, or as an alternative, further embodiments of the combustor panels may include that the angled sidewalls include a curvature in a direction from the peak to the effusion hole.

In addition to one or more of the features described above in one or more of the above embodiments, or as an alternative, further embodiments of the combustor panels may include one or more effusion holes passing through the combustor panel from the cold side to the hot side.

In addition to one or more of the features described above in one or more of the above embodiments, or as an alternative, further embodiments of the combustor panels may include that two adjacent recessed cells of the plurality of recessed cells share a peak.

In addition to one or more of the features described above in one or more of the above embodiments, or as an alternative, further embodiments of the combustor panels may include that the peak-valley gridded pattern includes one or more non-cell regions within the gird pattern of the plurality of recessed cells.

In addition to one or more of the features described above in one or more of the above embodiments, or as an alternative, further embodiments of the combustor panels may include that the angled sidewalls of each recessed cell are angled to funnel an impinging air into a respect effusion hole.

In addition to one or more of the features described above in one or more of the above embodiments, or as an alternative, further embodiments of the combustor panels may include that the peaks of the peak-valley gridded pattern define geometric shapes in the cold side and the angled sidewalls extend from the cold side toward the hot side.

In addition to one or more of the features described above in one or more of the above embodiments, or as an alternative, further embodiments of the combustor panels may include that the geometric shapes are squares.

In addition to one or more of the features described above in one or more of the above embodiments, or as an alternative, further embodiments of the combustor panels may include that the geometric shapes are polygons.

In addition to one or more of the features described above in one or more of the above embodiments, or as an alternative, further embodiments of the combustor panels may include that the geometric shapes include one or more of polygons, circular, and semi-circular shapes.

According to some embodiments, gas turbine engines are provided. The gas turbine engines include a combustor section having a combustor shell and one or more combustor panels mounted to the combustor shell. At least one combustor panel of the one or more combustor panels includes a hot side configured to be exposed to combustion within the combustor section, a cold side opposite the hot side of the combustor panel, the cold side facing the combustor shell and configured to receive cooling flow thereon, and a peak-valley gridded pattern formed on the cold side, the peak-valley gridded pattern comprising a plurality of recessed cells arranged in a grid pattern, with each recessed cell having a peak, angled sidewalls, and an effusion hole located at a bottom of the angled sidewalls.

In addition to one or more of the features described above in one or more of the above embodiments, or as an alternative, further embodiments of the gas turbine engines may include that the combustor shells includes a plurality of impingement holes configured to direct an impinging air toward the cold side.

In addition to one or more of the features described above in one or more of the above embodiments, or as an alternative, further embodiments of the gas turbine engines may include that the peaks of the peak-valley gridded pattern are arranged relative to the plurality of impingement holes such that the impinging air impinges on the peaks.

In addition to one or more of the features described above in one or more of the above embodiments, or as an alternative, further embodiments of the gas turbine engines may include that each combustor panel of the one or more combustor panels comprises a respective peak-valley gridded pattern.

In addition to one or more of the features described above in one or more of the above embodiments, or as an alternative, further embodiments of the gas turbine engines may include that the angled sidewalls include a curvature in a direction from the peak to the effusion hole.

In addition to one or more of the features described above in one or more of the above embodiments, or as an alternative, further embodiments of the gas turbine engines may include one or more effusion holes passing through the combustor panel from the cold side to the hot side.

In addition to one or more of the features described above in one or more of the above embodiments, or as an alternative, further embodiments of the gas turbine engines may include that the gas turbine engines includes that two adjacent recessed cells of the plurality of recessed cells share a peak.

In addition to one or more of the features described above in one or more of the above embodiments, or as an alternative, further embodiments of the gas turbine engines may include that the peak-valley gridded pattern includes one or more non-cell regions within the grid pattern of the plurality of recessed cells.

In addition to one or more of the features described above in one or more of the above embodiments, or as an alternative, further embodiments of the gas turbine engines may include that the angled sidewalls of each recessed cell are angled to funnel an impinging air into a respect effusion hole.

In addition to one or more of the features described above in one or more of the above embodiments, or as an alternative, further embodiments of the gas turbine engines may include that the peaks of the peak-valley gridded pattern define geometric shapes in the cold side and the angled sidewalls extend from the cold side toward the hot side.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
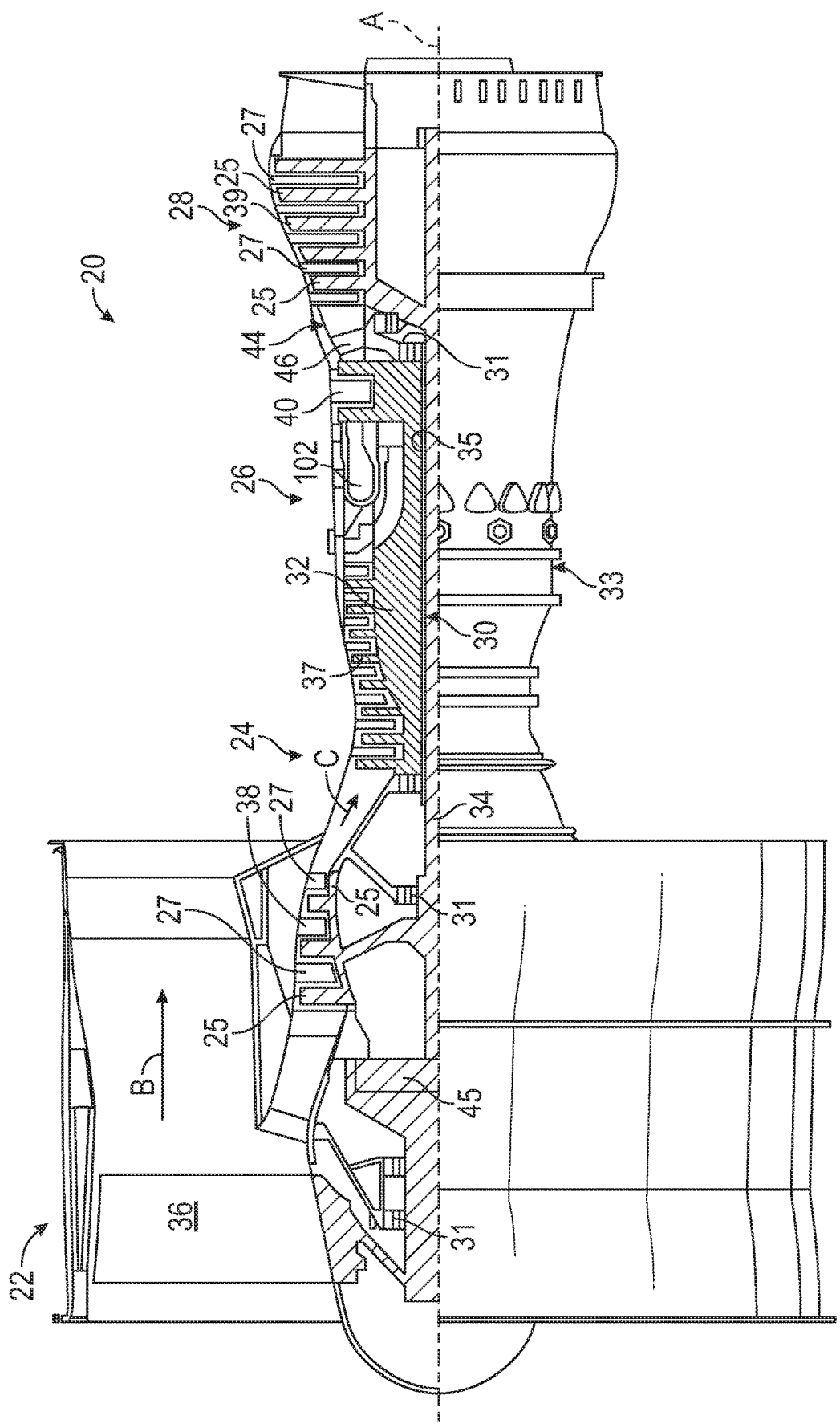
FIG. 1A is a schematic cross-sectional illustration of a gas turbine engine that may employ various embodiments disclosed herein.

FIG. 1A schematically illustrates a gas turbine engine 20. The exemplary gas turbine engine 20 is a turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 102 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 102, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be defined as the pressure measured prior to the inlet of the low pressure turbine 39 ratioed to the pressure at the outlet of the low pressure turbine 39 upstream to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram \degree R)/(518.7\degree R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 1B:
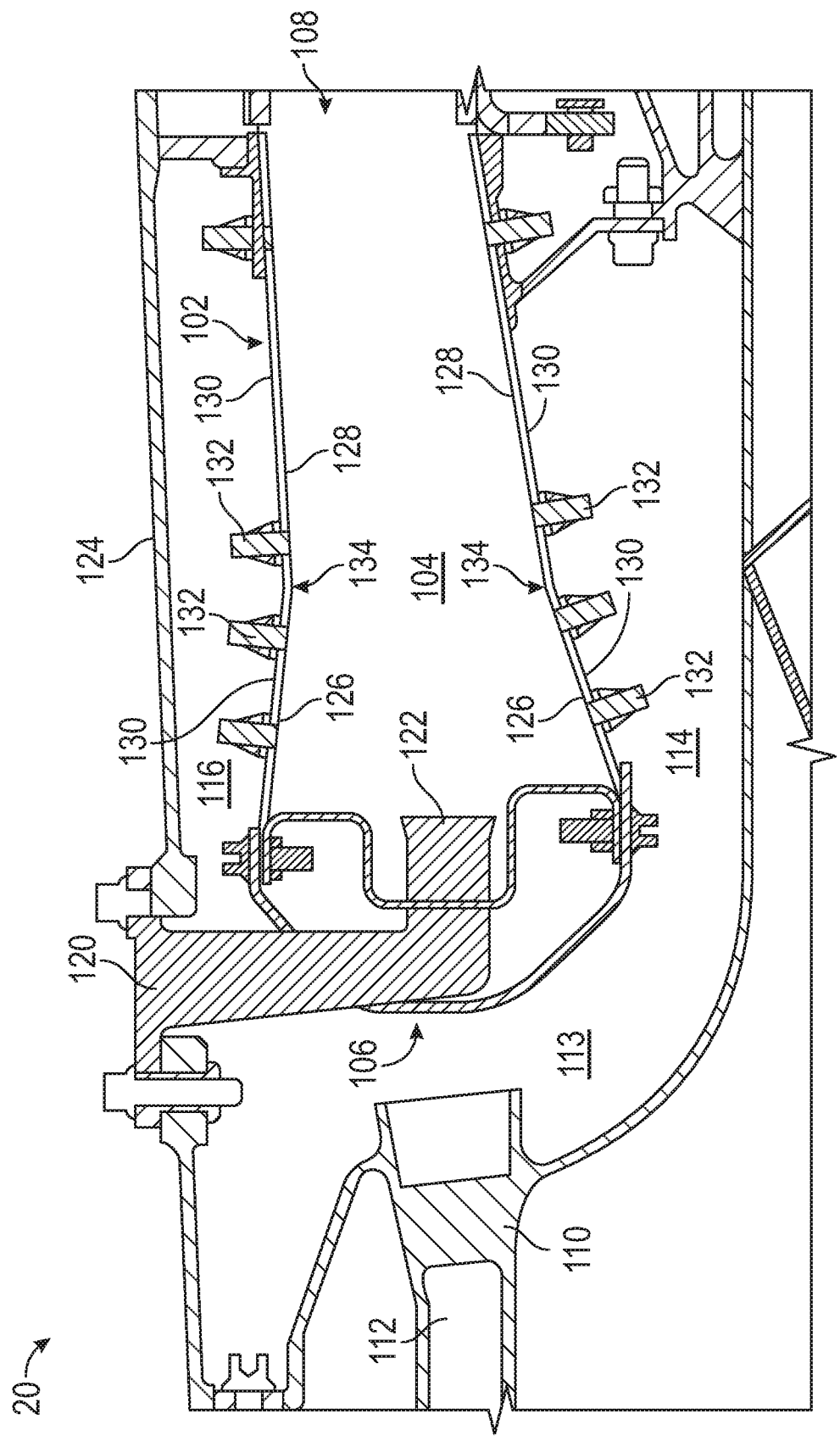
FIG. 1B is a schematic illustration of a combustor section of the gas turbine engine of FIG. 1A that may employ various embodiments disclosed herein.

FIG. 1B is a schematic illustration of a configuration of a combustion section of the engine 20 that can employ embodiments of the present disclosure. As shown, the engine 20 includes a combustor 102 defining a combustion chamber 104. The combustor 102 includes an inlet 106 and an outlet 108 through which air may pass. The air is supplied to the combustor 102 by a pre-diffuser 110.

In the configuration shown in FIG. 1B, air may be supplied from a compressor into an exit guide vane 112, as will be appreciated by those of skill in the art. The exit guide vane 112 is configured to direct the airflow into the pre-diffuser 110, which then directs the airflow toward the combustor 102. The combustor 102 and the pre-diffuser 110 are separated by a shroud plenum, cavity, or chamber 113 that contains the combustor 102. The shroud chamber 113 includes an inner diameter branch 114 and an outer diameter branch 116. As air enters the shroud chamber 113, a portion of the air will flow into the combustor inlet 106, a portion will flow into the inner diameter branch 114, and a portion will flow into the outer diameter branch 116. The air from the inner diameter branch 114 and the outer diameter branch 116 will then enter the combustion chamber 104 by means of one or more nozzles, holes, apertures, etc. that are formed on the external surfaces of the combustor 102. The air will then exit the combustion chamber 104 through the combustor outlet 108. At the same time, fuel is supplied into the combustion chamber 104 from a fuel injector 120 and nozzle 122. The fuel is ignited within the combustion chamber 104. The combustor 102 of the engine 20, as shown, is housed within a shroud case 124 which defines, in part, the shroud chamber 113.

The combustor 102, as will be appreciated by those of skill in the art, includes one or more combustor panels 126, 128 that are mounted on an interior surface of one or more combustor shells 130 and are configured parallel to the combustor shell 130 (whether at the inner or outer diameter). The combustor panels 126, 128 can be removably mounted to the combustor shell 130 by one or more attachment mechanisms 132. In some embodiments, the attachment mechanisms 132 can be integrally formed with a respective combustor panel 126, 128 and/or the combustor shell 130, although other configurations are possible. In some embodiments, the attachment mechanisms 132 are studs or other structures that extend from the respective combustor panel 126, 128 through the interior surface thereof to a receiving portion or aperture of the combustor shell 130 such that the panel 126, 128 can be attached to the combustor shell 130 and held in place.

The combustor panels 126, 128 may include a plurality of cooling holes and/or apertures to enable fluid, such as gases, to flow from areas external to the combustion chamber 104 into the combustion chamber 104. Impingement cooling may be provided from the shell-side of the panels 126, 128 and hot gases may be in contact with the combustion-side of the panels 126, 128 during combustion within the combustion chamber 104. That is, hot gases may be in contact with a surface of the panels 126, 128 that is facing the combustion chamber 104.

First panels 126, as shown in FIG. 1B, are configured about the inlet 106 of the combustor 102 and may be referred to as forward panels. Second panels 128 may be positioned axially rearward and adjacent the first panels 126 and may be referred to as aft panels. The first panels 126 and the second panels 128 are configured with a gap 134 formed between axially adjacent first panels 126 and second panels 128. The gap 134 may be a circumferentially extending gap that extends about a circumference of the combustor 102. A plurality of first panels 126 and second panels 128 may be attached and extend about an inner diameter of the combustor 102, and a separate plurality of first and second panels 126, 128 may be attached and extend about an outer diameter of the combustor 102, as known in the art.

Figure 1C:
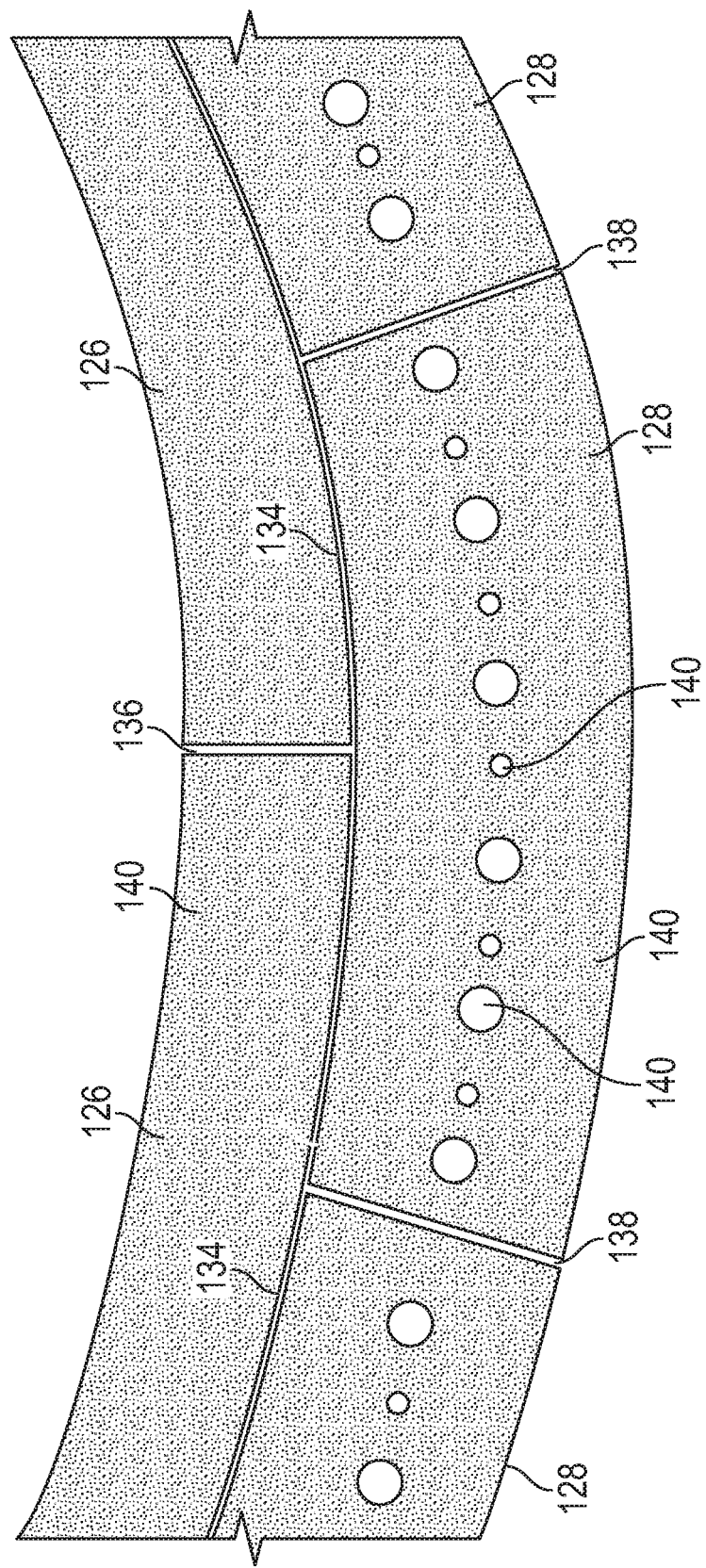
FIG. 1C is a schematic illustration of panels of the combustor of the combustor section shown in FIG. 1B that may employ various embodiment disclosed herein.

Turning now to FIG. 1C, a partial schematic illustration of a configuration of the combustor panels 126, 128 installed within the combustor 102 as viewed from the interior of the combustion chamber 104 is shown. The first panels 126 are installed to extend circumferentially about the combustion chamber 104 and form first axially extending gaps 136 between circumferentially adjacent first panels 126. Similarly, the second panels 128 are installed to extend circumferentially about the combustion chamber 104 and second axially extending gaps 138 are formed between circumferentially adjacent second panels 128. Moreover, as shown, a circumferentially extending gap 134 is shown between axially adjacent first and second panels 126, 128. Also shown in FIG. 1C are the various apertures 140 (e.g., impingement holes, dilution holes, holes, etc.) or other types of apertures and/or other fluid flow paths that are formed in the surfaces of the combustor panels 126, 128 to enable mixing flow to pass through the combustor panels 126, 128 (e.g., into and/or out of the page of FIG. 1C). As will be appreciated by those of skill in the art, additional (e.g., smaller) holes may be provided on the panels 126, 128 to provide cooling. Such additional holes may be cooling holes that are fed from a space between a shell and panel, with such space replenished with cooling air through impingement holes from the shroud, as will be appreciated by those of skill in the art.

Figure 2:
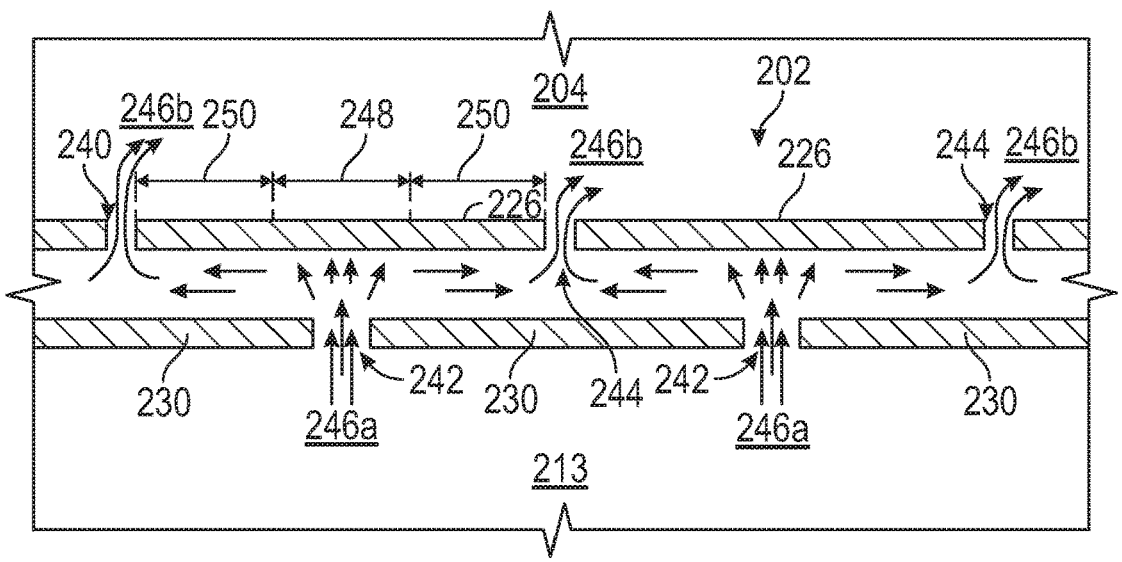
FIG. 2 is a schematic illustration of a combustor panel arranged relative to a combustor shell that can incorporate embodiments of the present disclosure.

Turning now to FIG. 2, a schematic illustration of a portion of a combustor 202 having a combustor shell 230 and a combustor panel 226 installed thereon that can incorporate embodiments of the present disclosure is shown. The combustor 202 can be formed similar to that shown and described above. The combustor shell 230 includes a plurality of impingement holes 242 and the combustor panel 226 includes a plurality of effusion holes 244. The impingement holes 242 are designed to enable a cooling flow of air 246 (having an impinging portion 246a and a film cooling portion 246b) to cool the combustor 202. The cooling flow of air 246 passes from a shroud chamber 213, through the impingement holes 242, through the effusion holes 244, and into a combustion chamber 204 of the combustor 202. The film cooling portion 246b of the cooling flow of air, as it enters the combustion chamber 204 through the effusion holes 244, can form a film of air over an interior surface of the combustor panel 226 to aid in cooling of the combustor panel 226. That is, the film cooling portion 246b can form a barrier between air at combustion temperatures and the combustor panel 226.

Although shown in FIG. 2 as simple passages, the effusion holes 244 may not be formed straight through or normal to the combustor panel 226. That is, as will be appreciated by those of skill in the art, effusion holes are often not formed normal to the panel, but rather can be angled, such as at shallow angles (e.g., 20-35 degrees, with the shallower angles beneficial for film cooling configuration (e.g., 20 degrees)) with respect to the plane of the combustor panel 226. Angled effusion holes can ensure and/or optimize the exit flowing air to "stick" to the combustor panel 226, thus creating a film cooling layer on the combustion chamber 204 side of the combustor panels 226. Further, in some embodiments, the impingement holes 242 can be formed normal to the combustor shell 230, as schematically shown in FIG. 2. Those of skill in the art will appreciate that FIG. 2 is provided for explanatory and illustrative purposes and is not to be limiting.

As schematically shown, the impinging portion 246a of the cooling air 246 will impinge upon and cool an impingement area or primary cooling zone 248 which is cooled by the cooling air 246. However, as the distance from the impingement hole 242 increases the effective cooling decreases at a secondary cooling zone 250 that is not cooled as effectively as the primary cooling zone 248.

The cooling air 246 cools the combustor panels 226 with impinging air 246a, which provides extremely high cooling (heat transfer coefficient) in the impingement zone (primary cooling zone 248), but the cooling quickly decays as the distance from the primary cooling zone 248 increases (e.g., the secondary cooling zone 250). Thus, the portion of the combustor panel 226 under the impingement hole 242 is locally very cool, but hotspots can occur in regions that are "far" (e.g., a distance greater than a few hole-diameters from the nearest impingement hole 242).

In addition to cooling decreases associated with distance from an impingement hole, dirt and other particulate matter can impact cooling, specifically at the location of impingement upon the hot combustor panel. Gas turbine engines must operate in a variety of environments, including those with suspended particles in the air (e.g., dirt, sand, etc.), whether in flight or on the ground (e.g., idling, taxiing, take-off, landing, etc.). The particles may be ingested into the engine and will be transported through the engine from an inlet to an outlet, and thus may pass through one or more of the sections of the gas turbine engine.

In the combustor, the particles, which may be reduced to very fine, micron sized particles (e.g., due to passing through the compressor section), may flow into the and through the cooling holes of the combustor. Combustors of gas turbine engines may use different approaches to provide cooling for combustor panels, including, but not limited to, effusion holes through a liner, slots through the liner; double wall systems with impingement holes through the shell, effusion holes through the liner/panels (i.e., impingement film floatwall), double-wall systems with holes through a liner feeding the space between the shell and panels, augmented heat transfer surface areas (e.g., pins, fins, or similar other features), double-wall systems that combine impingement, effusion, and surface enhancement, etc. The particles may collect on various surfaces within the gas turbine engine, including upon combustor panels, as the particles are impinged upon surfaces. Such particle aggregation may be caused by impinging flows or from separations in the flows (e.g., at the entrance of holes or around the pins or other features). When the particles collect on a heat transfer surface, such as the back side of a panel or liner, or in an effusion hole, the heat transfer through that surface is decreased, which leads to higher panel temperatures and ultimately, premature failure. The aggregation may be caused, in part, by impact forces (e.g., during an impingement) and/or due to the high temperatures such that the material of the particle bonds to or otherwise sticks to the surfaces. The aggregation of particles may be referred to as fouling of the surfaces.

Figure 3:
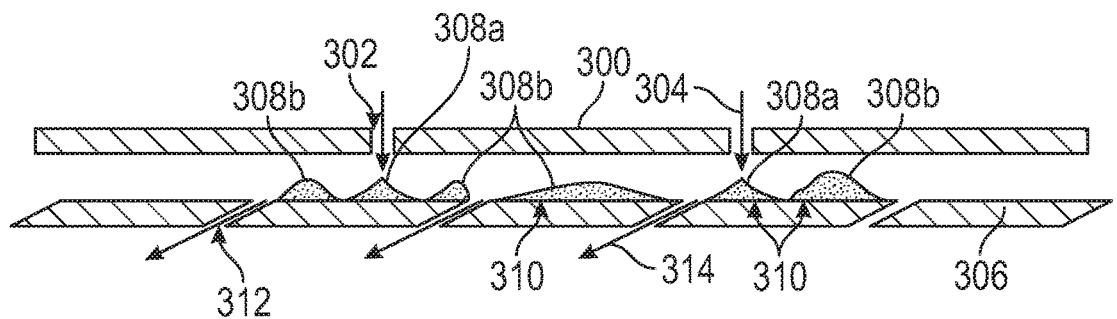
FIG. 3 is a schematic illustration of a combustor panel having particle deposits formed thereon.

The fouling of the heat transfer surfaces by the particles can reduce the life of the panels significantly (e.g., as much as 30-70%). In combustor applications, the particles collect on the "cold" side of the panel, where such particles are deposited by the impinging jets of air that come through the shell, for example as shown in FIG. 3. The particle deposits may have specific characteristic shapes or geometries. For example, one such shape is a "mound" shape 308a that is formed as the particles accumulate in a stagnation region as the impinging jet/air 304 strikes the "cold" side of the panel 306. Another example shape may be a "dune" shape 308b that results from a build-up in the areas between the impinging jets ("hot spots" described above) on the cold side of the panel 306. These mounds and dunes and other shapes may be caused by irregular or uneven aggregation and accumulation of particles in specific locations. That is, a non-uniform layer and/or pattern of particle deposits may be formed on a panel cold-side. This non-uniform patterning results in areas on the panel that may have more build-up of particles and other areas that may have less total build-up.

This may be exacerbated due to non-uniform cooling hole arrangements. The temperatures experienced by combustor panels is non-uniform, and thus certain areas may be hotter than others. For example, proximity to a fuel injection region and where combustion first occurs may be hotter than other locations along a combustor panel. Further, features such as stand-offs or supports may cause different thermal conditions around and proximate to such features.

The build-up and formation of particle deposits can cause cooling to be less effective, as the particle deposits may essentially insulate portions of a panel, thus resulting in cooling schemes being unable to effectively cool the panel surfaces that are coated and/or covered by particle deposits. This may result, in part, due to thermal properties and characteristics of the particles that may aggregate. The material properties of the particles may have lower thermal transfer qualities, and thus an impinging or cooling airflow in contact with the particle deposits may not as effectively cool a panel that has the material of the panel exposed to such cooling airflow.

Turning now to FIG. 3, a schematic illustration of a particle deposit is shown. In FIG. 3, a combustor liner 300 includes impingement holes 302 arranged to allow impinging air 304 to impinge upon and cool a portion of a combustor panel 306. The combustor panel 306 may be formed of a material to contain combustion and may have selective thermal transfer properties to aid in the cooling of the combustor panel 306. The impinging air 304 may include particles therein, as described above. Over time, the particles in the impinging air 304 may aggregate upon a surface of the combustor panel 306 to form particle deposits 308*a*, 308*b*. The particle deposits 308*a*, 308*b* will insulate, block, or otherwise prevent the impinging air 304 from cooling, at least, a portion 310 of the combustor panel 306. The particle deposits 308*a*, 308*b* may thus cause increased conditions for the portion 310 and may lead to part failure. As illustratively shown, the particle deposits 308*a*, 308*b* include mounds 308*a* located incident to or directly aligned with the impingement holes 302 and dunes 308*b* located between the impingement holes 302. The impinging air 304 will flow through the impingement holes 302, deposit particles to form the mounds 308*a*, and then flow to effusion holes 312 to provide an effusion cooling flow 314 that may provide a film cooling to the combustor panel 306. As the cooling air flows from the impingement holes 302 to the effusion holes 312, some particles will be carried to form the dunes 308*b*. The particle deposits 308*a*, 308*b*, as noted above, may prevent sufficient or desired cooling to the combustor panel 306.

Accordingly, improved cooling of combustor panels may provide improved life and operation of combustors in gas turbine engines.

Embodiments described herein are directed to combustor panel geometries that reduce the ability for particles to adhere to surfaces of the combustor panel. This is achieved by, for example, a gridded and peaked surface that provides for funneling of flow, thus reducing stagnation thereof, and thus particles cannot settle and adhere to a surface. Specifically, embodiments described herein may reduce the opportunities for cooling flow to stagnate. Fluids tend to follow the contours of the surfaces across which they flow. By introducing "peaks" in a geometric pattern or surface on the combustor panel, the flow is directed and does not have the same stagnation point as flow impinging on a flat surface. Dirt build-up in the "valleys" is avoided by locating the effusion holes at the valleys (i.e., between or defined by the peak structure), This, in effect, creates a funnel through which the cooling flow and any carried particles may be directed. In accordance with some embodiments described herein, these "peaks" and "valleys" are arranged in a gridded format to minimize stagnation regions.

Figure 4:
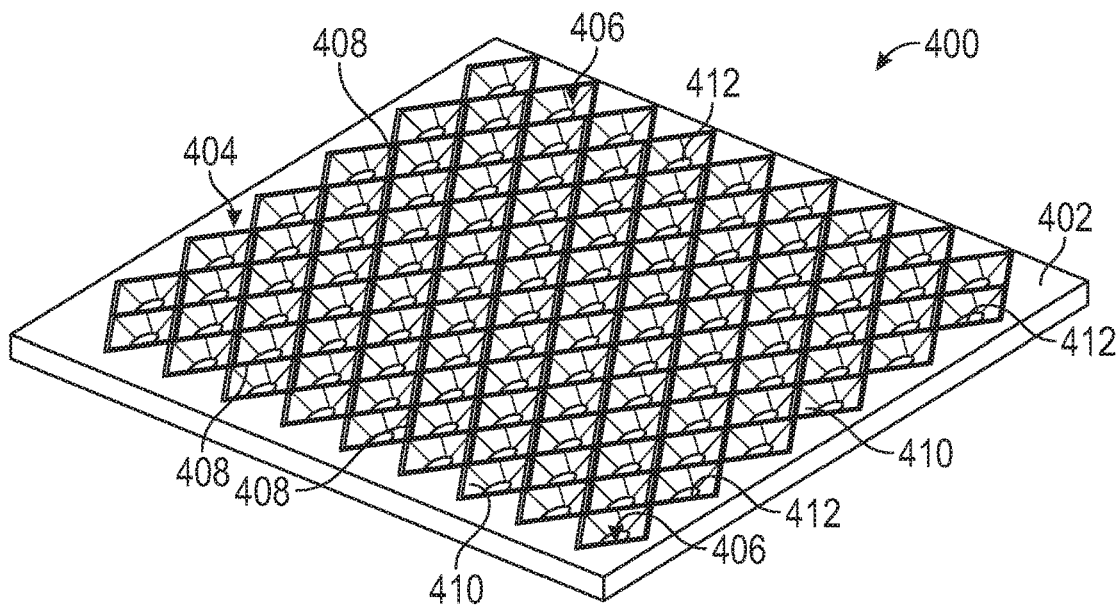
FIG. 4 is a schematic illustration of a combustor panel having a peak-valley gridded pattern in accordance with an embodiment of the present disclosure.

Turning to FIG. 4, a schematic illustration of a portion of a combustor panel 400 in accordance with an embodiment of the present disclosure is shown. The portion of the combustor panel 400 shown in FIG. 4 may be representative of an entire/complete combustor panel or a subportion of a combustor panel. The combustor panel 400 has a cold side 402, with a hot side opposite thereto. The hot side (not shown) is arranged facing and at least partially defining a combustion chamber of a gas turbine engine, when installed and in use. The hot side is thus exposed to hot gases and conditions, and the cold side 402 is configured to receive cooling flow, such as impinging air, through a combustor shell, to which the combustor panel 400 may be mounted.

In this embodiment, the combustor panel 400 includes a peak-valley gridded pattern 404 formed thereon. Specifically, the peak-valley gridded pattern 404 is defined by a plurality of recessed cells 406 arranged in a grid pattern. The recessed cells 406 are depressions or recesses from the cold side 402 (i.e., extend through the combustor panel 400 from the cold side 402 toward the opposing hot side). The recessed cells 406 include peaks 408 that define the grid pattern, angled sidewalls 410 that extend inward toward the hot side from the peaks 408, and effusion holes 412 located in the valleys of the peak-valley gridded pattern 404 (i.e., at the bottom of each recessed cell 406).

The peaks 408 and the angled sidewalls 410 are arranged and configured to funnel a cooling flow into and through each recessed cell 406 and thus have such cooling flow be funneled into and through the effusion holes 412 at the minimum or bottom of each recessed cell 406. The peaks 408 and angled sidewalls 410 around each recessed cell 406 of the peak-valley gridded pattern 404 directs flow toward the effusion holes 412 and prevents stagnation of flow that impinges on surfaces of the recessed cells 406. Any particles that are carried by cooling flow that enters the recessed cells 406 will be carried through the effusion holes at the valleys (minimums) of each recessed cell 406. As such, a funnel through which cooling flow and particles therein is created to prevent particle deposition and build-up.

Figure 5:
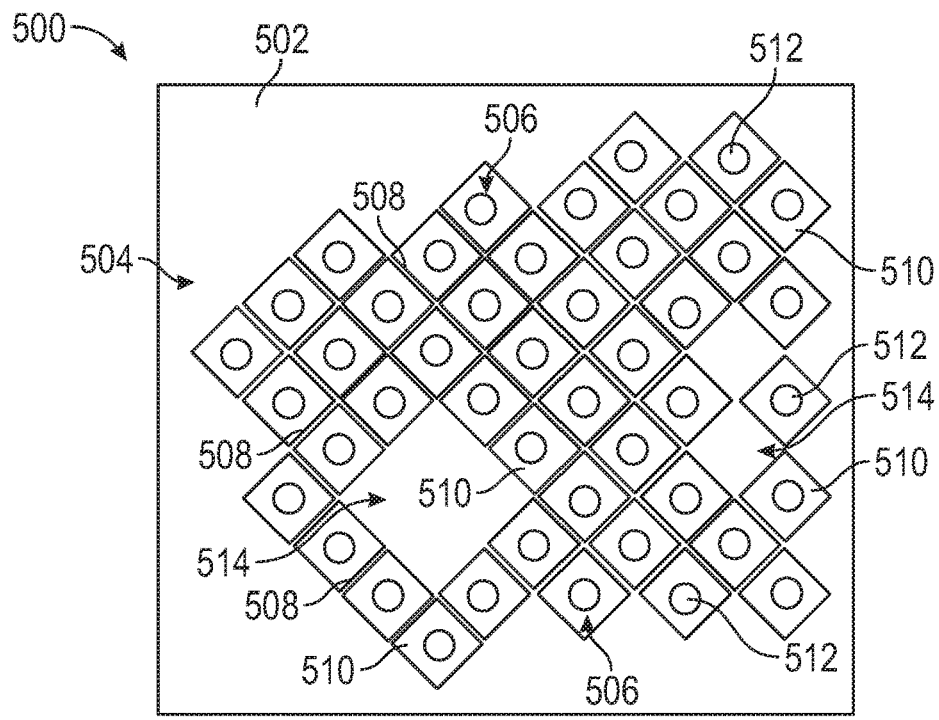
FIG. 5 is a schematic illustration of a combustor panel having a peak-valley gridded pattern in accordance with an embodiment of the present disclosure.

Turning to FIG. 5, a cold-side view, schematic illustration of a portion of a combustor panel 500 in accordance with an embodiment of the present disclosure is shown. The portion of the combustor panel 500 shown in FIG. 5 may be representative of an entire/complete combustor panel or a subportion of a combustor panel. The combustor panel 500 has a cold side 502, with a hot side opposite thereto. The hot side (not shown) is arranged facing and at least partially defining a combustion chamber of a gas turbine engine, when installed and in use. The hot side is thus exposed to hot gases and conditions, and the cold side 502 is configured to receive cooling flow, such as impinging air, through a combustor shell, to which the combustor panel 500 may be mounted.

In this embodiment, the combustor panel 500 includes a peak-valley gridded pattern 504 formed thereon, similar to that shown in FIG. 4. The peak-valley gridded pattern 504 is defined by a plurality of recessed cells 506 arranged in a grid pattern. The recessed cells 506 are depressions or recesses from the cold side 502 (i.e., extend through the combustor panel 500 from the cold side 502 toward the opposing hot side). The recessed cells 506 include peaks 508 that define the grid pattern, angled sidewalls 510 that extend inward toward the hot side from the peaks 508, and effusion holes 512 located in the valleys of the peak-valley gridded pattern 504 (i.e., at the bottom of each recessed cell 506). As shown, adjacent recessed cells 506 may share one or more peaks 508 with other recessed cells 506 within the peak-valley gridded pattern 504.

In this illustrative embodiment, the peak-valley gridded pattern 504 includes one or more non-cell regions 514. The non-cell regions 514 may be located at specific locations where particle aggregation may be low or due to other considerations, such as mounting structures for mounting the combustor panel 500 to a combustor shell and/or due to various cooling scheme requirements. However, even with the inclusion of such non-cell regions 514, the peak-valley gridded pattern 504 is defined by a gridded pattern of the recessed cells 506, with the recessed cells 506 each being defined by the peaks 508, the angled sidewalls 510, and the effusion holes 512 at the bottom thereof.

As shown in FIG. 5, each recessed cell 506 may have a substantially square shape in plan view (i.e., as viewing the cold side of the panel). As used herein, the term "substantially" is used to enable non-square or non-perfectly square shapes to be included within the "square shape" description. For example, depending on the requirements, a slightly rectangular or diamond shape may be employed. The term substantially square shape refers to a recessed cell having four angled sidewalls that are inclined from four separate peaks that define the geometry of the respective recessed cell in the plane or surface of the cold side. Although shown in FIGS. 4-5 as having substantially square geometries, such geometry is not to be limiting.

Figure 6:
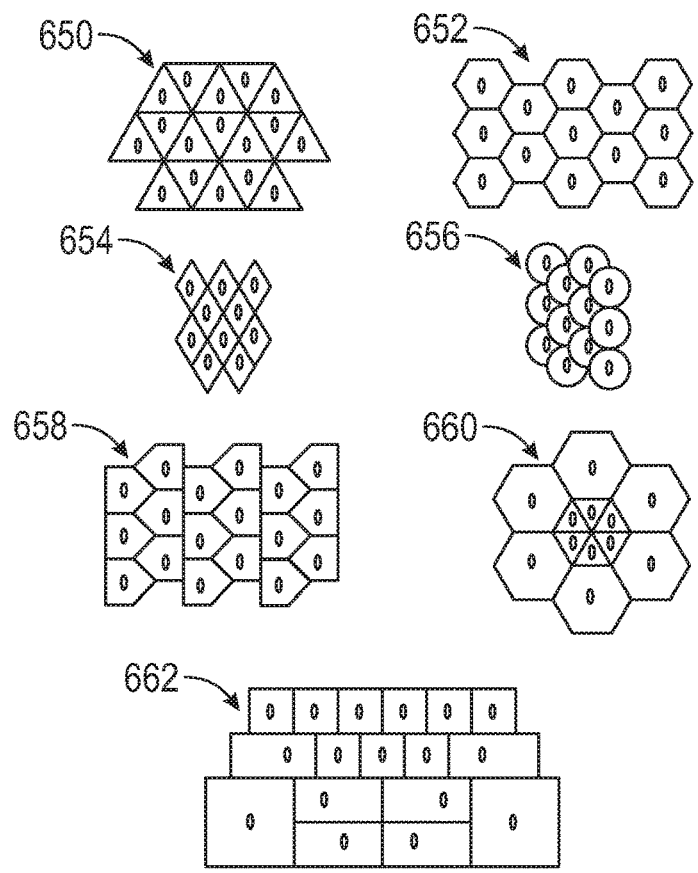
FIG. 6 provides a set of different example geometries for peak-valley gridded patterns in accordance with an embodiment of the present disclosure.

For example, turning to FIG. 6, various schematic illustrations of different peak-valley gridded pattern configurations/geometries are shown. A peak-valley gridded pattern 650 is shown having triangular shapes for each recessed cell of the peak-valley gridded pattern 650. The lines defining the triangular shape represent the peaks, with effusion holes arranged at a valley of each recessed cell of the peak-valley gridded pattern 650.

A peak-valley gridded pattern 652 is shown having polygon shapes for each recessed cell of the peak-valley gridded pattern 652 (as shown as hexagons). The lines defining the polygon shape represent the peaks, with effusion holes arranged at a valley of each recessed cell of the peak-valley gridded pattern 652. Although a hexagon pattern geometry is shown, various other polygons may be employed, without departing from the scope of the present disclosure (e.g., octagons, decagon, etc.). This configuration is representative of equilateral polygons, although such defining feature is not to be limiting.

A peak-valley gridded pattern 654 is shown having diamond shapes for each recessed cell of the peak-valley gridded pattern 654. The lines defining the diamond shape represent the peaks, with effusion holes arranged at a valley of each recessed cell of the peak-valley gridded pattern 654.

A peak-valley gridded pattern 656 is shown having circular and semi-circular shapes for each recessed cell of the peak-valley gridded pattern 656. The lines defining the rounded edges represent the peaks, with effusion holes arranged at a valley of each recessed cell of the peak-valley gridded pattern 656. Different arrangements of the circular and semi-circular recessed cells may be employed without departing from the scope of the present disclosure. Further, although circular and semi-circular shapes are shown, other rounded geometries may be employed, such as oval, elongated, etc., without departing from the scope of the present disclosure.

A peak-valley gridded pattern 658 is shown having non-equilateral polygon shapes for each recessed cell of the peak-valley gridded pattern 658. The lines defining the non-equilateral polygon shape represent the peaks, with effusion holes arranged at a valley of each recessed cell of the peak-valley gridded pattern 658. The illustrative geometry of the peak-valley gridded pattern 658 is merely illustrative and exemplary, and is not intended to be limiting.

In some embodiments, the peak-valley gridded patterns 660, 662 may include various combinations of geometries and/or sizes for the various recessed cells of the patterns. One peak-valley gridded pattern 660 includes equilateral polygons (hexagons) and triangles in combination, and another peak-valley gridded pattern 662 shows a combination of square and rectangular recessed cells, having different sizes and orientations. The mix geometry patterns of the peak-valley gridded patterns 660, 662 are merely illustrative and provide examples of mix geometries. Other mixed geometries and/or cell sizes may be employed without departing from the scope of the present disclosure.

Additionally, the peaks/ridges around a recessed cell may be repeated (or non-repeated) and may have a non-uniform height. For example, the peaks in the corners/vertices/intersection of geometric patterns of a given geometry may be higher than the ridgeline between the corners (i.e., walls of a given geometric shape). Further, the converse may be true, with higher peaks along the walls of a given geometric shape and lower peaks at the corners/intersections. Further, in some embodiments, the ridgelines defining geometric shapes may be of sufficient height to separate the flows between two adjacent recessed cells (or set of recessed cells).

Figure 7:
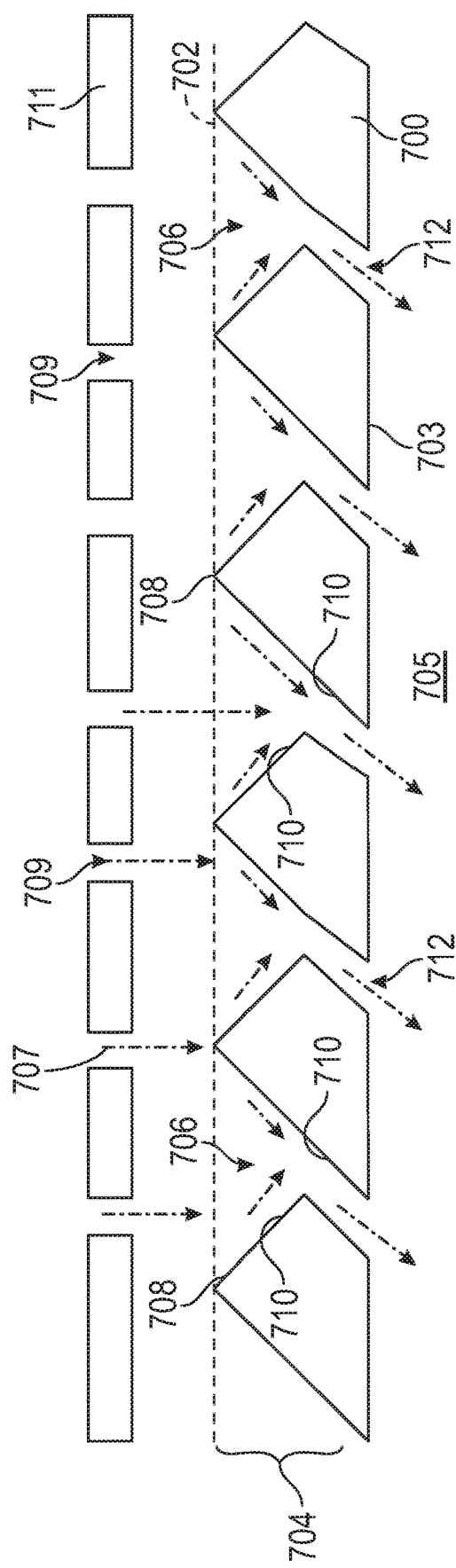
FIG. 7 is a schematic illustration of a combustor panel having a peak-valley gridded pattern in accordance with an embodiment of the present disclosure.

Turning to FIG. 7, a partial side cross-sectional schematic illustration of a portion of a combustor panel 700 in accordance with an embodiment of the present disclosure is shown. The portion of the combustor panel 700 shown in FIG. 7 may be representative of an entire/complete combustor panel or a subportion of a combustor panel. The combustor panel 700 has a cold side 702, with a hot side 703 opposite thereto. The hot side 703 is arranged facing and at least partially defining a combustion chamber 705 of a gas turbine engine, when installed and in use. The hot side 703 is thus exposed to the hot gases and conditions of the combustion chamber 705, and the cold side 702 is configured to receive cooling flow, such as impinging air 707, through one or more impingement holes 709 of a combustor shell 711, to which the combustor panel 700 may be mounted.

Similar to that shown and discussed above, the combustor panel 700 includes a peak-valley gridded pattern 704 formed thereon. The peak-valley gridded pattern 704 is defined by a plurality of recessed cells 706 arranged in a grid pattern. The recessed cells 706 are depressions or recesses from the cold side 702 that extend through the combustor panel 700 from the cold side 702 toward the opposing hot side 703. The recessed cells 706 include peaks 708 that define the grid pattern, angled sidewalls 710 that extend inward toward the hot side from the peaks 708, and effusion holes 712 located in the valleys of the peak-valley gridded pattern 504 (i.e., at the bottom of each recessed cell 706).

As shown in dashed-arrowed lines, a cooling flow will pass through the impingement holes 709 of the combustor shell 711 as impinging air 707. The impinging air 707 will impinge upon the combustor panel 700 and travel along the angled sidewalls 710 of the recessed cells 706. The peaks 708 reduce the surface area of the combustor panel 700 that is flat or normal to the impinging air 707, thus aiding in the direction and control of cooling flow across surfaces of the combustor panel 700. The impinging air 707 will travel along the angled sidewalls 710 and be directed or funneled into the effusion holes 712 at the bottom of each recessed cell 706. The air will then flow into the combustion chamber 707 and may form a film cooling on the hot side 703 of the combustor panel 700.

Figure 8:
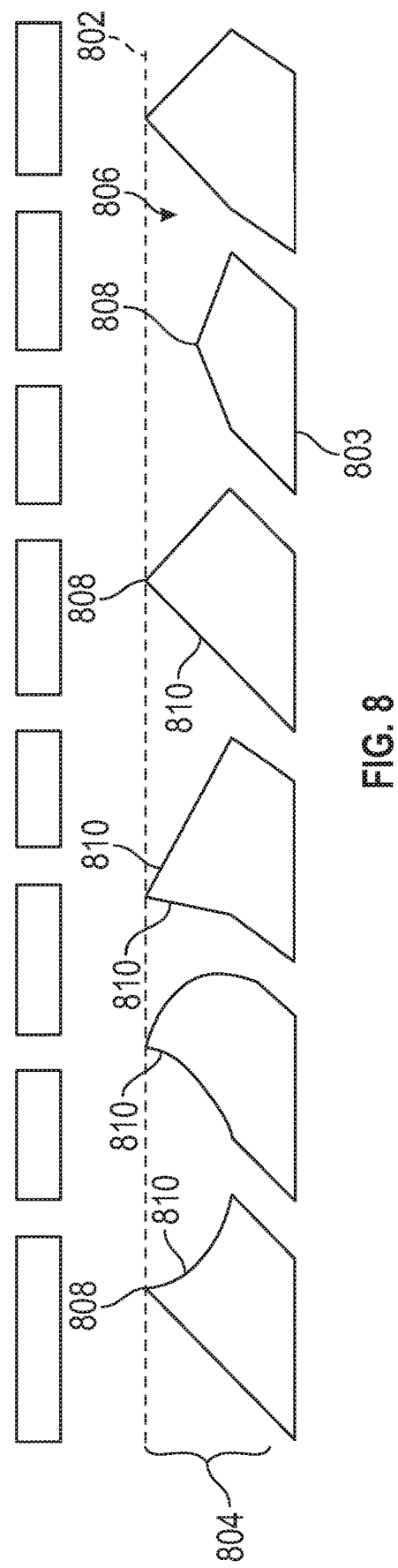
FIG. 8 is a schematic illustration of a combustor panel having a peak-valley gridded pattern in accordance with an embodiment of the present disclosure.

Turning to FIG. 8, a partial side cross-sectional schematic illustration of a portion of a combustor panel 800 in accordance with an embodiment of the present disclosure is shown. Similar to that shown and described with respect to FIG. 7, the combustor panel 800 has a cold side 802, with a hot side 803 opposite thereto. Similar to that shown and discussed above, the combustor panel 800 includes a peak-valley gridded pattern 804 formed thereon. The peak-valley gridded pattern 804 is defined by a plurality of recessed cells 806 arranged in a grid pattern. The recessed cells 806 are depressions or recesses from the cold side 802 that extend through the combustor panel 800 from the cold side 802 toward the opposing hot side 803. The recessed cells 806 include peaks 808 that define the grid pattern, angled sidewalls 810 that extend inward toward the hot side from the peaks 808, and effusion holes 812 located in the valleys of the peak-valley gridded pattern 804 (i.e., at the bottom of each recessed cell 806).

FIG. 8 illustrates different geometries that may be employed in the formation of the recessed cells 806 of the peak-valley gridded pattern 804. As shown, various angled sidewalls 810 may include curvatures or non-uniform slopes. Further, the angled slopes may be at different angles to achieve a desired flow control that may maximize cooling while minimizing or eliminating particle deposits. Further, as shown, in some configurations, the peaks 808 may be recessed from the cold side within the peak-valley gridded pattern 804; alternatively, the peaks may extend closer to a combustor shell than the surrounding material (i.e., higher than or beyond the cold side 802). Further, in some embodiment, the positioning of the location of the peaks 808 may be such that, when installed in a gas turbine engine, impingement holes of the combustor shell may be aligned with the peaks such that the impinging air will impinge upon the peak 808 and be divided into different recessed cells 806.

Although shown and described herein with various numbers and arrangements of recessed cells of a peak-valley gridded pattern on combustor panels, those of skill in the art will appreciate that such examples are provided for illustrative and explanatory purposes and are not to be limiting. For example, the number, geometry, size, distribution, etc. of the recessed cells that comprise the peak-valley gridded pattern can be selected to optimize thermal conductivity and balance such optimization with other conditions and/or considerations, including, but not limited to, combustor panel strength, combustor panel weight, location and arrangement of impingement holes, effusions holes, and/or attachment mechanisms.

Advantageously, embodiments described herein provide for improved combustor panels. By having a peak-valley gridded pattern to channel or funnel cooling flow through a combustor panel, particle deposits may be reduced or eliminated while maintaining sufficient cooling to such panels. Thus, in operation, particle deposits may be minimized or eliminated, and thus part life may be improved.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A combustor panel of a gas turbine engine comprising:
a hot side configured to be exposed to combustion within the gas turbine engine;
a cold side opposite the hot side of the combustor panel, the cold side configured to receive cooling flow thereon, wherein the cold side defines a reference planar surface; and
a peak-valley gridded pattern formed on the cold side, the peak-valley gridded pattern comprising a plurality of recessed cells arranged in a grid pattern, with each recessed cell having angled sidewalls with peaks disposed distally to the angled sidewalls and opposite the hot side and a respective effusion hole located at a bottom of the angled sidewalls and the plurality of recessed cells are recessed relative to the reference planar surface and the peaks contact the reference planar surface or are recessed relative to the reference planar surface, and
wherein the angled sidewalls of at least one cell of the plurality of recessed cells have linear slopes.

2. The combustor panel of claim 1, w herein the angled sidew ails of the at least one recessed cell includes a curvature in a direction from the peak to the respective effusion hole.

3. The combustor panel of claim 1, wherein two adjacent recessed cells of the plurality of recessed cells have a respective shared peak of the peaks between the two adjacent recessed cells.

4. The combustor panel of claim 1, wherein the peak-valley gridded pattern includes one or more non-cell regions within the grid pattern of the plurality of recessed cells, wherein the non-cell regions have a surface level with the reference planar surface.

5. The combustor panel of claim 1, wherein the angled sidewalls of each recessed cell are angled to funnel a portion of the cooling flow through the respective effusion hole of each recessed cell.

6. The combustor panel of claim 1, wherein the peaks of the angled sidewalls define geometric shapes in the cold side and the angled sidewalls extend from the peaks on the cold side toward the hot side.

7. The combustor panel of claim 6, wherein the geometric shapes are squares.

8. The combustor panel of claim 6, wherein the geometric shapes are polygons.

9. The combustor panel of claim 6, wherein the geometric shapes include one or more of polygons, circular, and semi-circular shapes.

10. A gas turbine engine comprising:
a combustor section having a combustor shell and one or more combustor panels mounted to the combustor shell,
wherein at least one combustor panel of the one or more combustor panels comprises:
a hot side configured to be exposed to combustion within the combustor section;
a cold side opposite the hot side of the at least one combustor panel, the cold side facing the combustor shell and configured to receive cooling flow thereon, wherein the cold side defines a reference planar surface; and
a peak-valley gridded pattern formed on the cold side, the peak-valley gridded pattern comprising a plurality of recessed cells arranged in a grid pattern, with each recessed cell having angled sidewalls with peaks disposed distally to the angled sidewalls and opposite the hot side and a respective effusion hole located at a bottom of the angled sidewalls and the plurality of recessed cells are recessed relative to the reference planar surface and the peaks contact the reference planar surface or are recessed relative to the reference planar surface, and
wherein the angled sidewalls of at least one cell of the plurality of recessed cells have linear slopes.

11. The gas turbine engine of claim 10, wherein the combustor shell includes a plurality of impingement holes configured to direct the cooling flow toward the cold side.

12. The gas turbine engine of claim 11, wherein the peaks of the angled sidewalls are arranged relative to the plurality of impingement holes such that the cooling flow impinges on the peaks.

13. The gas turbine engine of claim 10, wherein the at least one combustor panel comprises each combustor panel of the one or more combustor panels comprises a respective peak-valley gridded pattern.

14. The gas turbine engine of claim 10, wherein the angled sidewalls of the at least one recessed cell includes a curvature in a direction from the peak to the respective effusion hole.

15. The gas turbine engine of claim 10, wherein two adjacent recessed cells of the plurality of recessed cells have a respective shared peak of the peaks between the two adjacent recessed cells.

16. The gas turbine engine of claim 10, wherein the peak-valley gridded pattern includes one or more non-cell regions within the grid pattern of the plurality of recessed cells, wherein the non-cell regions have a surface level with the reference planar surface.

17. The gas turbine engine of claim 10, wherein the angled sidewalls of each recessed cell are angled to funnel a portion of the cooling flow through the respective effusion hole of each recessed cell.

18. The gas turbine engine of claim 10, wherein the peaks of the angled sidewalls define geometric shapes in the cold side and the angled sidewalls extend from the peaks on the cold side toward the hot side.

* * * * *